June 29, 1965   YOSHIYA MATSUI   3,191,497
CATADIOPTRIC OPTICAL SYSTEM OF LARGE RELATIVE APERTURE
Filed July 18, 1961
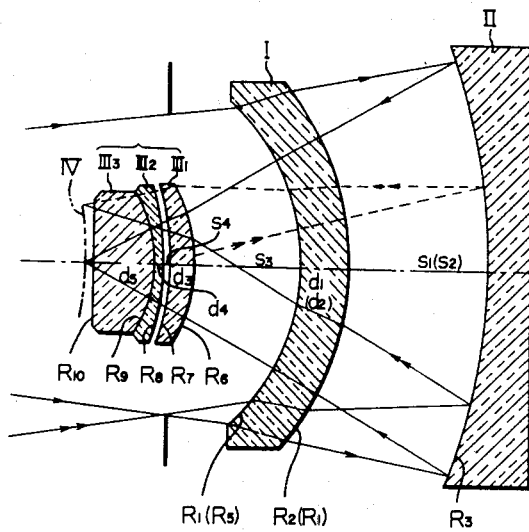
FIG. 1
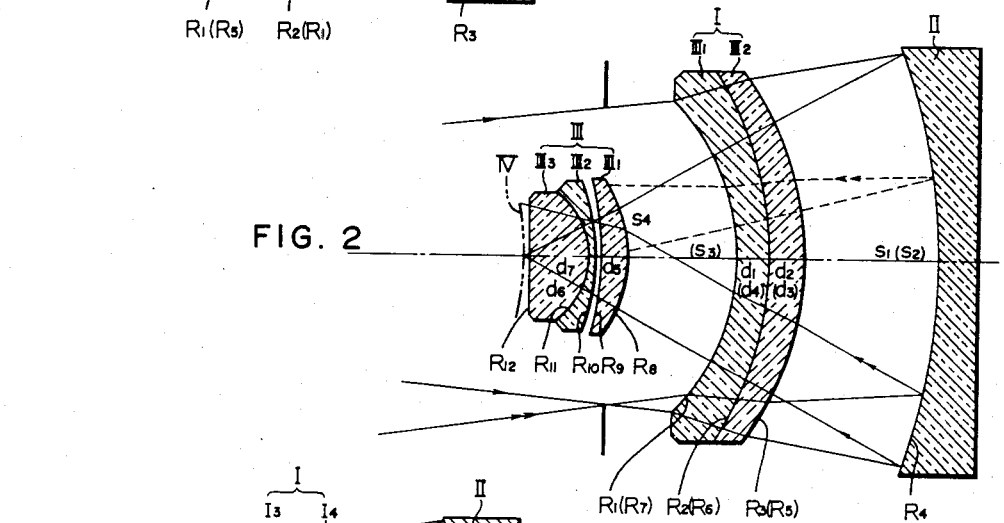
FIG. 2
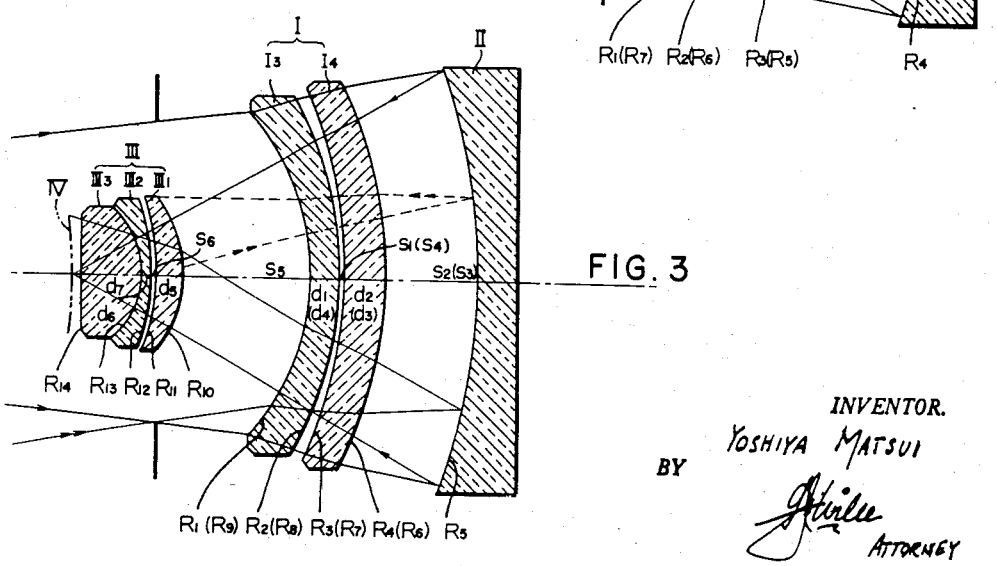
FIG. 3
INVENTOR.
YOSHIYA MATSUI
BY
ATTORNEY

United States Patent Office 3,191,497
Patented June 29, 1965

3,191,497
CATADIOPTRIC OPTICAL SYSTEM OF LARGE RELATIVE APERTURE
Yoshiya Matsui, Tokyo, Japan, assignor to Canon Camera Co., Inc., Ohta-ku, Tokyo, Japan, a corporation of Japan
Filed July 18, 1961, Ser. No. 124,944
Claims priority, application Japan, July 23, 1960, 32,206/60
4 Claims. (Cl. 88—57)

The present invention relates to the catadioptric optical system appropriate to cameras which, like those for indirect X-ray photography etc., require especially large relative apertures and clear image contrast.

In conventional catadioptric optical systems using concave spherical reflecting mirrors, the divergent meniscus lens is positioned in the reflecting mirror as a correcting member, but this arrangement has a marked disadvantage in film handling during photographing in that its image plane reveals the strong convex curvature. Further, there are two types of correcting members: one is placed with its concave surface opposite and toward the reflecting mirror, and the other is placed opposite and toward the object. In the former, where the correcting member has its concave surface toward the reflecting mirror, the image field appears in the area between the correcting member and the reflecting mirror. Such appearance of the image field involves a decided disadvantage in the disposition and the handling of the sensitive materials in photographing. In the latter, where the correcting member has the concave surface opposite the object, the image field appears in both areas, either in the inner side of the correcting member or in the outer side thereof, and, in either case, the image field appears very close to the correcting member, being even closer as the original objective system has a large relative aperture. When the image appears in the inner side of correcting member, namely nearer to the reflecting mirror than the correcting member, it has the same disadvantage in photographing as in the first mentioned type, and when the image appears in the outer side of the correcting member, namely, nearer to the object than the correcting member, it gives the same result in photographing as in the other cases, for the image appears so close to the concave surface of the meniscus lens that it may be covered by this concave surface.

The object of the present invention is to provide catadioptric optical systems of large relative aperture, in which the curvature of the image field is some one-third of that of the conventional types and with optimum abberration correction maintained.

Another object of the present invention is to provide catadioptric optical systems of large relative aperture, in which the image field appears in the outer side of the whole optical system and is separate and apart therefrom, for facility of changing act of a film.

Another object of the present invention is to provide catadioptric optical systems of large relative aperture, in which a lens system specifically for flattening the image field (hereinafter designated the "field flattener") is placed opposite the concave spherical reflecting mirror, the correcting member being interposed therebetween.

Another object of the present invention is to provide catadioptric optical systems of large relative aperture, in which the refractive power of the concave spherical reflecting mirror is weaker than that of the conventional catadioptric optical systems and the curvature of its correcting member is also relatively weak by the disposition of the specific field flattener.

Other objects, advantages and features of this invention will become more apparent from the following description of illustrative embodiments thereof when read in conjunction with the drawing in which:

FIG. 1 shows a first illustrative embodiment of the catadioptric optical system of large relative aperture of the present invention;

FIG. 2 discloses a second illustrative embodiment thereof; and

FIG. 3 shows a third illustrative embodiment thereof.

The catadioptric optical system in accordance with the present invention consists of three components: a weak divergent correcting member of meniscus lenses, a concave spherical reflecting mirror at the rear of said correcting member, and a convergent field flattener disposed at the opposite side of the reflecting mirror with respect to the correcting member, the field flattener comprising at least three single lenses which include at least one divergent lens. In the whole system, all refractive and reflective surfaces, except the surface of the field flattener nearest to the image field, are concave toward the object. Furthermore, when the composite focal length of the whole system is $f$, the present optical system satisfies the following conditions:

(1) The radius of curvature of the concave spherical reflecting mirror exceeds $2.2f$;
(2) The focal length of the field flattener is less than $2f$;
(3) The whole thickness of said field flattener is of a value from $0.5f$ to $0.25f$; and
(4) The distance between this system and the image field IV is less than $0.08f$.

In FIGURES 1 to 3, I is the correcting member, II the concave spherical reflecting mirror which reflects the light traveled through correcting member I, III the field flattener, the light which has been reflected by reflecting mirror II passing through the correcting member and the field flattener, and IV is the image field. Correcting member 1 is of a single negative meniscus lens in the first embodiment, but is a cemented doublet of a single negative meniscus $I_1$ and a single positive meniscus $I_2$ and having negative refraction as a whole in the second embodiment, and is a doublet of a single negative meniscus $I_3$ and a single positive meniscus $I_4$ and having negative refracting power as a whole in the third embodiment. Field flattener III consists of a positive meniscus lens $III_1$ and a cemented doublet of a negative meniscus $III_2$ and a plano-convex or nearly plano-convex lens $III_3$, in the order of the passage of light. All the refractive and reflective surfaces of the whole system, except the rearmost surface, are concave toward the object.

Numerical values of examples of these three embodiments of the present invention are as follows, where $f$ denotes the focal length of the whole system, $R_1$, $R_2 \ldots$ radii of curvature of the refractive and reflective surfaces, respectively, in the direction of the passage of light. (However, all surfaces convex to the object have positive signs regardless of the direction of light passage.)

$d_1, d_2$ ... axial thicknesses of the respective lenses in the order as mentioned above, $S_1, S_2$ ... air spacings between the respective lenses and the reflective mirror, in the order as mentioned above, $N_1, N_2$ ... refractive indices of the respective lenses in the order as mentioned, and $V_1, V_2$ ... Abbe number of the respective lenses in the order as mentioned.

In the first embodiment:

[$f=1$. Relative aperture=1:0.63 Image magnification=1/6.4]

| | | | |
|---|---|---|---|
| $R_1 = -0.89025$ | $d_1=0.2$ | $N_1=1.51633$ | $V_1=64.1$ |
| $R_2 = -1.12294$ | $S_1=0.55879$ | | |
| $R_3 = -2.36770$ | Reflective surface | | |
| $R_4 = -1.12294$ | $S_2=0.55879$ | | |
| $R_5 = -0.89025$ | $d_2=0.2$ | $N_2=1.51633$ | $V_2=64.1$ |
| $R_6 = -0.60387$ | $S_3=0.40326$ | | |
| $R_7 = -1.82836$ | $d_3=0.12$ | $N_3=1.51633$ | $V_3=64.1$ |
| $R_8 = -1.05009$ | $S_4=0.004$ | | |
| $R_9 = -0.51633$ | $d_4=0.04$ | $N_4=1.71736$ | $V_4=29.5$ |
| $R_{10} = \infty$ | $d_5=0.25035$ | $N_5=1.51633$ | $V_5=64.1$ |

In the second embodiment:

[$f=1$. Relative aperture=1:0.63. Image magnification=1/6.4]

| | | | |
|---|---|---|---|
| $R_1 = -0.91610$ | $d_1=0.13$ | $N_1=1.51633$ | $V_1=64.1$ |
| $R_2 = -1.30416$ | $d_2=0.15$ | $N_2=1.62004$ | $V_2=36.3$ |
| $R_3 = -1.22272$ | $S_1=0.52067$ | | |
| $R_4 = -2.47795$ | Reflective surface | | |
| $R_5 = -1.22272$ | $S_2=0.52067$ | | |
| $R_6 = -1.30416$ | $d_3=0.15$ | $N_3=1.62004$ | $V_3=36$ |
| $R_7 = -0.91610$ | $d_4=0.13$ | $N_4=1.51633$ | $V_4=64.1$ |
| $R_8 = -0.51040$ | $S_3=0.44151$ | | |
| $R_9 = -1.59396$ | $d_5=0.12$ | $N_5=1.51633$ | $V_5=64.1$ |
| $R_{10} = -0.91390$ | $S_4=0.004$ | | |
| $R_{11} = -0.31872$ | $d_6=0.04$ | $N_6=1.71736$ | $V_6=29.5$ |
| $R_{12} = \infty$ | $d_7=0.21975$ | $N_7=1.51633$ | $V_7=64.1$ |

In the third embodiment:

[$f=1$. Relative aperture=1:0.63. Image magnification=1/6.4]

| | | | |
|---|---|---|---|
| $R_1 = -0.95546$ | $d_1=0.13011$ | $N_1=1.51633$ | $V_1=64.1$ |
| $R_2 = -1.37887$ | $S_1=0.0043$ | | |
| $R_3 = -1.91034$ | $d_2=0.16129$ | $N_2=1.62004$ | $V_2=36.3$ |
| $R_4 = -1.68398$ | $S_2=0.3823$ | | |
| $R_5 = -2.38359$ | Reflective surface | | |
| $R_6 = -1.68398$ | $S_3=0.3823$ | | |
| $R_7 = -1.91034$ | $d_3=0.16129$ | $N_3=1.62004$ | $V_3=36.3$ |
| $R_8 = -1.37887$ | $S_4=0.0043$ | | |
| $R_9 = -0.95546$ | $d_4=0.13011$ | $N_4=1.51633$ | $V_4=64.1$ |
| $R_{10} = -0.50339$ | $S_5=0.51095$ | | |
| $R_{11} = -1.33064$ | $d_5=0.12043$ | $N_5=1.51633$ | $V_5=64.1$ |
| $R_{12} = -0.94432$ | $S_6=0.0043$ | | |
| $R_{13} = -0.32242$ | $d_6=0.03978$ | $N_6=1.71736$ | $V_6=29.5$ |
| $R_{14} = +6.25930$ | $d_7=0.23726$ | $N_7=1.51633$ | $V_7=64.1$ |

The field flattener has the advantage that it flattens the image field, but, on the other hand, it disadvantageously tends to injure the superior aberration correction which is one of characteristics of reflecting mirror systems and to obstruct the incident bundle of light rays by the reason that the diameter of the field flattener being larger than the available field of image formation. In this invention, interception of the incident light has successfully been reduced to a minimum, the advantageous conditions of aberration correction being maintained by the whole thickness of said field flattener being in the range of $0.5f$ to $0.25f$, and the distance between the rearmost surface thereof and the image field being under $0.08f$. Such reduction of the whole thickness of field flattener and its adjacency to the image field effectively prevent spherical aberration from increasing by undercorrection, which said flattener would tend to invite. Such arrangement of the field flattening system, comprising three or more lenses involving at least one divergent lens, is effective not only in removing lateral chromatic aberration but also in correcting for all other aberrations. Furthermore, in the whole optical system, all the refractive surfaces are concave toward the object, except for the nearest surface, corresponding to the image field, are flat or substantially, this arrangement being very effective in aberration correction. Furthermore, the above-mentioned field flattener has a fairly large positive refraction power, and enables reducing the refracting power of the concave spherical reflecting mirror to a greater extent than in the case of conventional catadioptric optical systems, and, hence, the spherical reflecting mirror, radius of curvature thereof hitherto having been under some $2.2f$, may be made to have a value in excess of $2.2f$. This means that undercorrection for spherical aberration in this concave spherical reflecting mirror may fairly be smaller than that in conventional one. Moreover, the spherical aberration in the field flattener being small, the curvature of the correcting member can be comparatively mild because the requisite spherical aberration correction in the correcting member being alleviated, it is possible to position the correcting member adjacent to the reflecting mirror, and the image field appears apart from said correcting member in the outer side thereof.

It will be understood that this invention is not limited to the specific materials, figures, etc., and other details described above and illustrated in the drawing, but can be carried out with various modifications without departing from the scope of the invention, as defined in the appended claims.

What is claimed is:

1. A catadioptric optical system of large relative aperture comprising a correcting member of a single negative meniscus lens, a concave spherical mirror and a field flattening system consisting of a positive meniscus, a negative meniscus and a plano-convex lens and having the following numerical values:

[$f=1$. Relative aperture=1:0.63. Image magnification=1/6.4]

| | | | |
|---|---|---|---|
| $R_1 = -0.89025$ | $d_1=0.2$ | $N_1=1.51633$ | $V_1=64.1$ |
| $R_2 = -1.12294$ | $S_1=0.55879$ | | |
| $R_3 = -2.36770$ | reflective surface | | |
| $R_4 = -1.12294$ | $S_2=0.55879$ | | |
| $R_5 = -0.89025$ | $d_2=0.2$ | $N_2=1.51633$ | $V_2=64.1$ |
| $R_6 = -0.60387$ | $S_3=0.40326$ | | |
| $R_7 = -1.82836$ | $d_3=0.12$ | $N_3=1.51633$ | $V_3=64.1$ |
| $R_8 = -1.05009$ | $S_4=0.004$ | | |
| $R_9 = -0.51633$ | $d_4=0.04$ | $N_4=1.71736$ | $V_4=29.5$ |
| $R_{10} = \infty$ | $d_5=0.25035$ | $N_5=1.51633$ | $V_5=64.1$ | where $f$ denotes the total focal length of the entire optical system, $R_1, R_2$ ... the radii of curvature of the refractive and reflective surfaces respectively in the order of light passage, with all surfaces convex to the object having positive sign regardless of the direction of light passage;

$d_1, d_2$ ... the axial thickness of the respective lenses in such order;

$S_1, S_2$ ... the air spacings between the respective lenses and the reflective mirror, in such order;

$N_1, N_2$ ... the refractive indices of the respective lenses in such order, and $V_1, V_2$ ... the Abbe numbers for the respective lenses in such order.

2. A catadioptric optical system of large relative aperture comprising a correcting lens array consisting of a cemented doublet of a single nagative meniscus and a single positive meniscus lens, a concave spherical reflecting mirror, and a field flattening system consisting of a positive meniscus, a negative meniscus and a plano-convex lens, and having the following numerical values:

[$f=1$. Relative aperture=1:0.63. Image magnification=1/6.4]

| | | | |
|---|---|---|---|
| $R_1 = -0.91610$ | $d_1 = 0.13$ | $N_1 = 1.51633$ | $V_1 = 64.1$ |
| $R_2 = -1.30416$ | $d_2 = 0.15$ | $N_2 = 1.62004$ | $V_2 = 36.3$ |
| $R_3 = -1.22272$ | $S_1 = 0.52067$ reflective surface | | |
| $R_4 = -2.47795$ | $S_2 = 0.52067$ | | |
| $R_5 = -1.22272$ | $d_3 = 0.15$ | $N_3 = 1.62004$ | $V_3 = 36.3$ |
| $R_6 = -1.30416$ | $d_4 = 0.13$ | $N_4 = 1.51633$ | $V_4 = 64.1$ |
| $R_7 = -0.91610$ | $S_3 = 0.44151$ | | |
| $R_8 = -0.51040$ | $d_5 = 0.12$ | $N_5 = 1.51633$ | $V_5 = 64.1$ |
| $R_9 = -1.59396$ | $S_4 = 0.004$ | | |
| $R_{10} = -0.93190$ | $d_6 = 0.04$ | $N_6 = 1.71736$ | $V_6 = 29.5$ |
| $R_{11} = -0.31872$ | $d_7 = 0.21975$ | $N_7 = 1.51633$ | $V_7 = 64.1$ |
| $R_{12} = \infty$ | | | | where $f$ denotes the focal length of the entire system, $R_1, R_2$ ... the radii of curvature of the refractive and reflective surfaces respectively in the order in which incident light passes, those for surfaces convex to the object have positive sign regardless of the direction in which light travels therethrough, $d_1, d_2$ ... the axial thicknesses of the lenses respectively in the order mentioned, $S_1, S_2$ ... the air spacings between the lenses respectively and the reflecting mirror, in the order mentioned, $N_1, N_2$ ... the refractive indices of the lenses respectively in the order mentioned, and $V_1, V_2$ ... the Abbe numbers for the lenses respectively in the order mentioned.

3. A catadioptric optical system of large relative aperture comprising a correcting system of a single negative meniscus lens and a single positive meniscus lens, a concave spherical reflecting mirror, and a field flattening system of a positive meniscus lens, a negative meniscus lens and a nearly plano-convex lens, and having the following numerical values:

[$f=1$. Relative aperture=1:0.63. Image magnification=1/6.4]

| | | | |
|---|---|---|---|
| $R_1 = -0.95546$ | $d_1 = 0.13011$ | $N_1 = 1.51633$ | $V_1 = 64.1$ |
| $R_2 = -1.37887$ | $S_1 = 0.0043$ | | |
| $R_3 = -1.91034$ | $d_2 = 0.16129$ | $N_2 = 1.62004$ | $V_2 = 36.3$ |
| $R_4 = -1.68398$ | $S_2 = 0.3823$ reflective surface | | |
| $R_5 = -2.38359$ | $S_3 = 0.3823$ | | |
| $R_6 = -1.68398$ | $d_3 = 0.16129$ | $N_3 = 1.62004$ | $V_3 = 36.3$ |
| $R_7 = -1.91034$ | $S_4 = 0.0043$ | | |
| $R_8 = -1.37887$ | $d_4 = 0.13011$ | $N_4 = 1.51633$ | $V_4 = 64.1$ |
| $R_9 = -0.95546$ | $S_5 = 0.51095$ | | |
| $R_{10} = -0.50339$ | $d_5 = 0.12043$ | $N_5 = 1.51633$ | $V_5 = 64.1$ |
| $R_{11} = -1.33064$ | $S_6 = 0.0043$ | | |
| $R_{12} = -0.94432$ | $d_6 = 0.03978$ | $N_6 = 1.71736$ | $V_6 = 29.5$ |
| $R_{13} = -0.32242$ | $d_7 = 0.23726$ | $N_7 = 1.51633$ | $V_7 = 64.1$ |
| $R_{14} = +6.25930$ | | | | where $f$ denotes the focal length of the entire system, $R_1, R_2$ ... the radii of curvature of the refractive and reflective surfaces respectively in the order in which incident light passes therethrough, those for surfaces convex to the object having positive sign regardless of the direction in which light travels therethrough, $d_1, d_2$ ... the axial thicknesses of the lenses respectively in the order mentioned, $S_1, S_2$ ... the air spacings between the lenses respectively and the reflecting mirror, in the order mentioned, $N_1, N_2$ ... the refractive indices of the lenses respectively in the order mentioned, $V_1, V_2$ ... the Abbe numbers for the lenses respectively in the order mentioned.

4. A catadioptric optical system of large relative aperture comprising a weakly divergent correcting member of meniscus lenses, a concave spherical reflecting mirror positioned to the rear of the correcting member, and a convergent field flattener consisting of at least three single lenses including at least one divergent lens, the convergent field flattener being positioned in front of the correcting member, all of the refractive surfaces, except the surface of the field flattener the nearer image field, of the lenses and the reflective surface of the mirror being concave toward the object, and the radius of curvature of the reflecting surface of the mirror is greater than $2.2f$, the focal length of the field flattener is less than $2f$, the total thickness of the field flattener is in the range from $0.5f$ to $0.25f$, and the spacing between the image field and the most adjacent surface of the system is less than $0.08f$, where $f$ is the focal length of the system.

References Cited by the Examiner
UNITED STATES PATENTS 2,229,302   1/41   Martin et al.
2,409,971   10/46  Bennett _____ 88—57

FOREIGN PATENTS 544,694   4/42   Great Britain.

OTHER REFERENCES

Flugge: "Neuere Spiegelobjektive" Zeitschrift for Instrumentenkunde, June 1941, pp. 175–184.

FREDERICK M. STRADER, *Primary Examiner.*
WILLIAM MISIEK, JEWELL H. PEDERSEN,
*Examiners.*